United States Patent [19]

Benya et al.

[11] 4,366,969
[45] Jan. 4, 1983

[54] ADJUSTABLE LEVELING SUSPENSION UNIT FOR VEHICLES

[75] Inventors: Robert J. Benya, St. Charles; Gary D. Swinney, Lake St. Louis, both of Mo.

[73] Assignee: Moog Automotive, Inc., St. Louis, Mo.

[21] Appl. No.: 287,496

[22] Filed: Jul. 21, 1981

[51] Int. Cl.³ .......................................... B60G 17/02
[52] U.S. Cl. ................................ 280/668; 280/710; 267/8 R; 267/34; 267/117
[58] Field of Search ............... 280/668, 710, 666, 667, 280/285, 286; 267/8 R, 34, 48, 11 R, 20 R, 20 A, 64.21, 177

[56] References Cited

U.S. PATENT DOCUMENTS

| | | | |
|---|---|---|---|
| 2,756,045 | 7/1956 | Savory | 267/117 |
| 3,168,927 | 11/1971 | Nicholls | 267/117 |
| 4,036,335 | 7/1977 | Thompson | 267/34 |
| 4,079,922 | 3/1978 | Nicholls | 267/34 |
| 4,348,016 | 9/1982 | Milly | 267/117 |

*Primary Examiner*—Robert R. Song
*Attorney, Agent, or Firm*—Gravely, Lieder & Woodruff

[57] ABSTRACT

An adjustable leveling suspension unit for vehicle shock absorbers having an external coil compression spring in cooperation therewith in the general manner of the MacPherson type strut assembly. The adjustable leveling unit includes a seat for the coil spring which is slidable on the shock cylinder, a collar and sleeve combination on the shock cylinder in position to support the seat and to slide the seat to different positions on the shock cylinder when necessary to correct for spring sag and restore the shock absorber to its desired position, and a guide or key to hold the spring seat against rotation while being moved on the shock cylinder.

8 Claims, 2 Drawing Figures

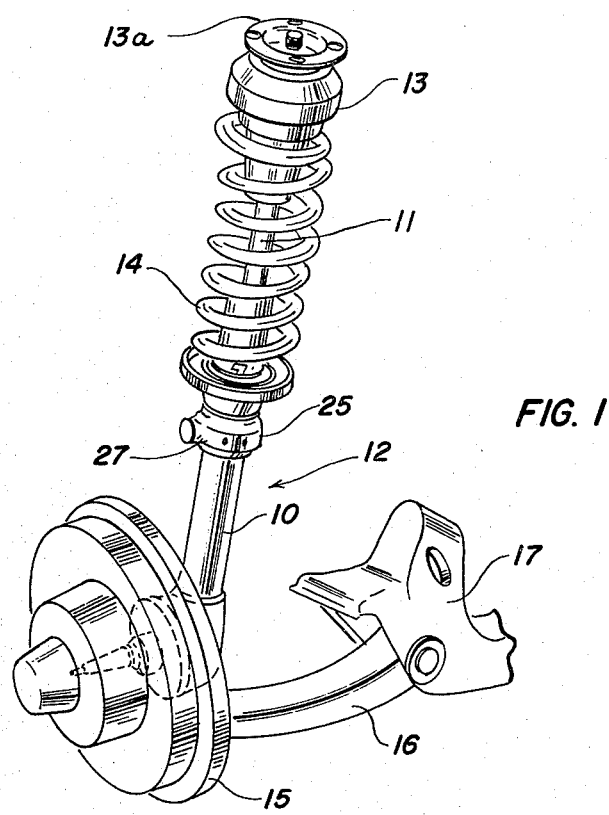
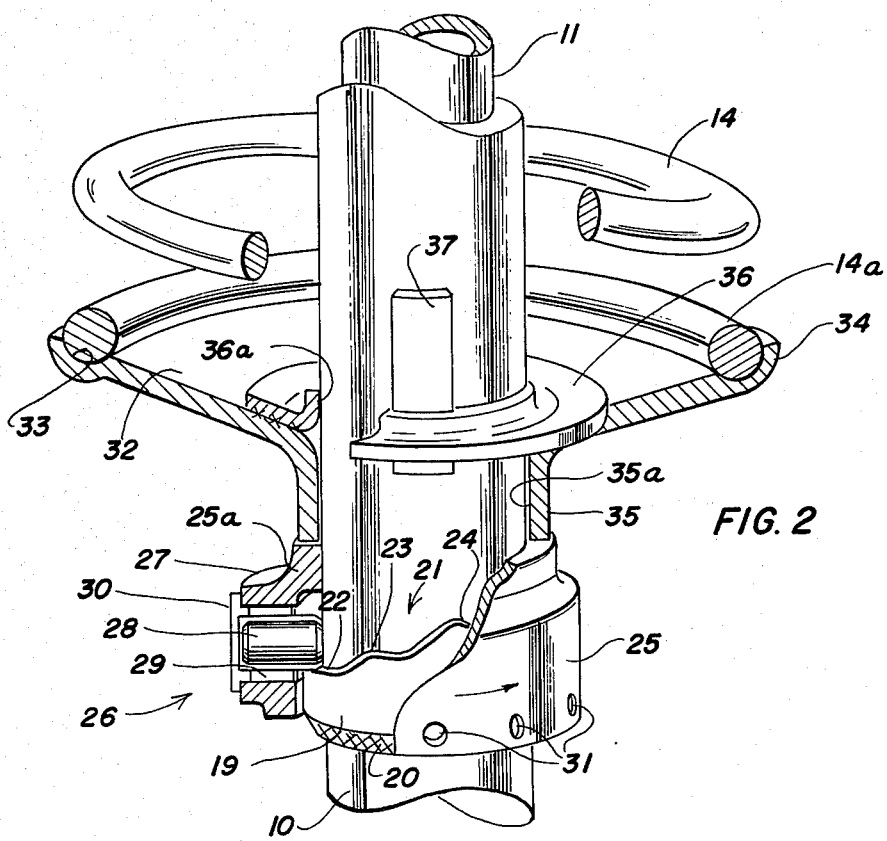

ADJUSTABLE LEVELING SUSPENSION UNIT FOR VEHICLES

BACKGROUND OF THE INVENTION

1. Field of the Invention

This invention relates to an adjustable leveling suspension unit for vehicle shock absorbers having a coil compression spring, the leveling unit being intended to compensate for spring sag and to allow for leveling the vehicle height.

2. Description of the Prior Art

Suspension systems for vehicles include hydraulic telescopic dampers and coil spring combinations in a variety of arrangements. In one form of suspension system the load supporting coil spring is fitted over the damper body to abut on a sleeve which is angularly and axially movable on the damper body, all as seen in Savory U.S. Pat. No. 2,756,045 of July 24, 1956. A somewhat similar arrangement can be found in Nicholls U.S. Pat. No. 3,618,927 of Nov. 9, 1971.

Means limited to accommodating the heighth of the vehicle frame relative to the road surface for purposes of leveling the vehicle frame is seen in Hans Hagi Switzerland Pat. No. 283,288 of Sept. 16, 1952.

The prior art includes examples of MacPherson suspension arrangements having fixed supports for the coil springs as seen in MacPherson U.S. Pat. No. 2,624,592 of Jan. 6, 1953, and MacPherson U.S. Pat. No. 2,660,449 of Nov. 24, 1953. More recent examples are Pacis et al U.S. Pat. No. 4,260,176 and Pflughaupt et al U.S. Pat. No. 4,260,177, both of Apr. 7, 1981.

Other examples in the prior art are Arlasky U.S. Pat. No. 3,603,575, Thompson et al U.S. Pat. No. 4,036,335, Nicholls U.S. Pat. No. 4,079,922, and Keijzer et al U.S. Pat. No. 3,954,257.

The problem with the prior art is that the correction for spring sag or fatigue requires overcoming high-friction loads in very restricted areas. Also, the systems that do provide for adjustment are quite limited in the amount of correction that can be obtained. Furthermore, a major problem in adjustable devices is the high-friction loads which are present and which require great torque effort to make adjustments, usually in a tight or restricted area.

SUMMARY OF THE INVENTION

The adjustable leveling suspension strut and spring arrangement is adapted for vehicle leveling purposes at all wheels, but has particular applications to allow an optimum front end alignment for vehicles through adjustment of the vehicle height. Certain objects of this arrangement are to achieve static camber setting, vehicle leveling side-to-side and front-to-rear, and maximum steering and suspension component life.

A further important object of the invention is to overcome the high-friction loads present in the prior art devices which call for the application of considerably torque to obtain the adjustment.

Another object of the invention is to overcome the adjustment difficulties present in the prior art devices, and to avoid dismantling or removing components in order to effect the vehicle leveling adjustment.

BRIEF DESCRIPTION OF THE DRAWINGS

The foregoing advantages found in the present leveling suspension arrangement will be apparent to those skilled in the vehicle suspension art upon reference to the accompanying drawings, wherein:

FIG. 1 is a perspective view of a vehicle suspension unit and spring arrangement incorporating the present invention; and FIG. 2 is a greatly enlarged, part sectioned view of the portions of the view in FIG. 1 having to do with the leveling adjustment features.

DESCRIPTION OF THE PREFERRED EMBODIMENT

Referring to FIG. 1, the vehicle suspension unit comprises the elongated and telescoping members 10 and 11 of the usually hydraulic or pneumatic shock absorber unit 12. The member 11 is the rod member of the shock unit 12, and it is provided with a fitting 13 which forms an abutment for the upper end of a coil suspension spring 14. The fitting 13 is part of a general bracket 13a forming an attachment to the sprung part of the vehicle. The reservoir or cylinder member 10 of the shock absorber has its lower end (seen in broken outline) connected to the wheel support 15 in the area of the lower arm 16 which is pivotally connected into an adjacent frame part 17.

In FIG. 1 and in greater detail in FIG. 2 there is seen the suspension leveling adjustment arrangement associated with the shock absorber and its coil spring. The arrangement comprises a collar 19 fixed by weldment 20 about its base margin to the exterior surface of the shock cylinder 10. The collar 19 extends about the cylinder and is formed with a stepped margin 21 which presents a series of surfaces 22, 23 and 24 (those which are visible) which are spaced varying distances from the base margin, as measured in the direction of elongation of the cylinder 10.

The collar is normally covered by a rotary sleeve 25 to prevent foreign matter accumulating on the stepped margin 21. The sleeve is shown in partial section to reveal the detail of the sleeve support means 26 which is assembled in a radially projecting boss 27. While only one means 26 is shown, to simplify the drawing, it is understood that more than one means 26 may be supplied such as a pair thereof at 180° spacing. The assembly includes a roller pin 28 carried in a suitable bearing 29 fitted in the bore of the boss 27, and a cover 30 closes the bore and retains the roller pin in position to ride on the stepped margin 21 of the collar. As shown, the sleeve 25 has a close fit on the cylinder at its upper inwardly offset margin 25a, and is enlarged therebelow to allow for suitable clearance over the collar 21. A series of holes 31 are formed in sleeve 25 about the lower margin at about 45° spacing so that at least two holes 31 will be in alignment on a diameter to receive the working ends of a spanner tool for rotating the sleeve to move the roller pin into any one of the stepped surfaces 22, 23 or 24. The number of holes 31 allows for easy placement of a tool used to rotate the sleeve. The usual location of the units does not have a large area in which to manipulate a tool. The view of FIG. 2 shows the roller pin engaged on surfaces 22 which may be the one for minimum height adjustment.

The lower turn 14a of the coil spring 14 is supported in abutment on a seat 32 and is retained in a shallow trough 33 adjacent a raised flange 34. The central portion of the seat 32 is formed with a cylindrical extension 35 having a cylindrical inner surface or bore 35a adapted to stabilize the seat against tipping or binding. There is a fixed plate 36 carried on the seat in position to present a further cylindrical inner surface 36a which cooperates with the bore 35a. Both bore surfaces 35a and 36a are notched or have an off-set which fits over a guide key 37 welded to the cylinder 10 of the shock absorbers. The two bores 35a and 36a cooperate to present a substantial surface to keep the seat 32 level. The key 37 fixed on the cylinder 10 is in a position such that the seat 32 has freedom to slide longitudinally on the cylinder 10 but may not turn or rotate. Thus as the sleeve 25 may be rotated for effecting adjustment there is a sliding reaction between the sleeve 25 and the extension 35 on the seat 32.

Now that the structure of the suspension unit and its associated components have been described in relation to a presently preferred embodiment, it can be appreciated that as the coil spring 14 develops sag the seat 32 can be elevated on the cylinder by applying a spanner tool to the holes 31 in the sleeve and rotating the sleeve (as noted by the arrow) to cause the roller pin 28 to move from the step surface 22 to the next higher surface 23, or even to a still higher surface 24. During the sleeve rotation it will push the plate 35 upwardly on the cylinder 10 to elevate the coil spring 14 and correct for spring sag to the extent required. The guide 37 will allow the plate 35 longitudinal movement but prevent rotary movement.

In the normal operation of the suspension shock absorber and its coil spring, the jouncing reaction and fatigue factors cause some loss in the original support between the sprung and unsprung structure. Spring sag can affect the stroke of the shock absorber piston rod and that can create a loss in the desired attitude of the frame. The present adjustable unit is intended to restore the level attitude of the frame and in accomplishing that the raising of the base support for the coil spring restores the position of the piston and its rod in the shock absorber cylinder.

While a preferred embodiment has been shown and described, modifications may be made within the teaching of the specification, and all such modifications are to be included therein as permitted by the failure of the prior art to so teach the same.

What is claimed is:

1. An adjustable suspension unit for a vehicle provided with a coil spring surrounding a shock absorber of the type having two relatively telescoping elongated members with one member securable to a portion of the vehicle frame and the other member securable to a wheel of the vehicle, the improvement comprising:
    (a) a collar fixed to one of said members and having a base margin and a stepped margin, said stepped margin presenting a series of surfaces which are spaced from said base margin at different distances as measured in the direction of elongation of said one member;
    (b) a sleeve cooperating with said collar and formed with means for permitting adjustment of said sleeve relative to said fixed collar;
    (c) sleeve support means carried by said sleeve in position to engage any one of said series of surfaces of said stepped margin of said collar upon adjusting the position of said sleeve relative to said collar;
    (d) seat means slidably carried by said one member in position to rest upon said sleeve and be moved thereby upon sleeve movement; said seat means being engaged by one end of the coil spring; and
    (e) means on said seat means and said one member in position to direct movement of said seat means along said one member during adjustment of said sleeve relative to said collar.

2. The adjustable suspension unit set forth in claim 1, wherein said sleeve surrounds and covers said collar, and said sleeve is provided with means for permitting adjustment of said sleeve relative to said fixed collar comprises tool engaging surfaces.

3. The adjustable suspension unit set forth in claim 1, wherein said sleeve support means comprises a roller element mounted on said sleeve in position to engage on said stepped margin of said fixed collar.

4. The adjustable suspension unit set forth in claim 1, wherein said sleeve support means comprises a bearing and a roller element carried in said bearing in position to have rolling engagement on said stepped margin of said collar.

5. The adjustable suspension unit set forth in claim 1, wherein said seat means includes means providing an elongated bearing surface engaged on said one member for stabilizing the position of said seat means.

6. The adjustable suspension unit set forth in claim 1, wherein said sleeve is formed with a bearing surface surrounding said one elongated member, said seat means is formed with a cooperating surface engaged on said sleeve bearing surface, and said means on said seat means and said one elongated member includes a fixed element aligned longitudinally of said one member to guide movement of said seat means in the direction longitudinally of said one member during adjustment of said sleeve.

7. The adjustable suspension unit set forth in claim 1, wherein said collar is a cylindrical member having an annular base margin fixed to said one member and an annular stepped margin in which said series of surfaces are spaced around said one member.

8. The adjustable suspension unit set forth in claim 1, wherein said sleeve fits over said collar and is formed with an inwardly offset margin for embracing said one member adjacent said stepped margin of said collar.

* * * * *

UNITED STATES PATENT AND TRADEMARK OFFICE
CERTIFICATE OF CORRECTION

PATENT NO. : 4,366,969

DATED : January 4, 1983

INVENTOR(S) : Robert J. Benya and Gary D. Swinney

It is certified that error appears in the above-identified patent and that said Letters Patent is hereby corrected as shown below:

On the title page, the filing date of "July 21, 1981" should be "July 27, 1981".

Signed and Sealed this

First Day of March 1983

[SEAL]

Attest:

GERALD J. MOSSINGHOFF

Attesting Officer                Commissioner of Patents and Trademarks